US012718453B2

(12) United States Patent
Wang et al.

(10) Patent No.: US 12,718,453 B2
(45) Date of Patent: Aug. 25, 2026

(54) CHARACTER SIMULATION

(71) Applicant: NVIDIA Corporation, Santa Clara, CA (US)

(72) Inventors: Jingbo Wang, ShaTin (HK); Ye Yuan, Santa Clara, CA (US); Cheng Xie, Toronto (CA); Sanja Fidler, Toronto (CA); Jan Kautz, Lexington, MA (US); Umar Iqbal, Fremont, CA (US); Zan Gojcic, Zurich (CH); Sameh Khamis, Alameda, CA (US)

(73) Assignee: NVIDIA Corporation, Santa Clara, CA (US)

(*) Notice: Subject to any disclaimer, the term of this patent is extended or adjusted under 35 U.S.C. 154(b) by 340 days.

(21) Appl. No.: 18/455,084

(22) Filed: Aug. 24, 2023

(65) Prior Publication Data

US 2024/0153188 A1 May 9, 2024

Related U.S. Application Data

(60) Provisional application No. 63/423,441, filed on Nov. 7, 2022.

(51) Int. Cl.
*G06T 13/40* (2011.01)
*G06T 7/246* (2017.01)

(52) U.S. Cl.
CPC .............. *G06T 13/40* (2013.01); *G06T 7/251* (2017.01); *G06T 2207/20084* (2013.01); *G06T 2210/21* (2013.01)

(58) Field of Classification Search
None
See application file for complete search history.

(56) References Cited

U.S. PATENT DOCUMENTS

2010/0284607 A1* 11/2010 Van Den Hengel .... G06T 7/564 382/154
2013/0127873 A1* 5/2013 Popovic .................. G06T 13/40 345/473
2014/0198107 A1* 7/2014 Thomaszewski ....... G06T 13/00 345/473

(Continued)

OTHER PUBLICATIONS

Vondrak et al., "Physical Simulation for Probabilistic Motion Tracking", (Year: 2008).*

(Continued)

*Primary Examiner* — Hilina K Demeter
(74) *Attorney, Agent, or Firm* — Foley & Lardner LLP

(57) ABSTRACT

In various examples, systems and methods are disclosed relating to generating physics-plausible whole body motion, including determining a mesh sequence corresponding to a motion of at least one dynamic character of one or more dynamic characters and a mesh of a terrain using a video sequence, determining using a generative model and based at least one the mesh sequence and the mesh of the terrain, an occlusion-free motion of the at least one dynamic character by infilling physics-plausible character motions in the mesh sequence for at least one frame of the video sequence that includes an occlusion of at least a portion of the at least one dynamic character, and determining physics-plausible whole body motion of the at least one dynamic character by applying physics-based imitation upon the occlusion-free motion.

18 Claims, 11 Drawing Sheets

(56) References Cited

U.S. PATENT DOCUMENTS

| | | | | |
|---|---|---|---|---|
| 2020/0184718 | A1* | 6/2020 | Chiu | G06T 7/20 |
| 2021/0304478 | A1* | 9/2021 | Tashiro | G06N 20/00 |
| 2022/0397686 | A1* | 12/2022 | Scacchi | G01S 19/485 |
| 2023/0026278 | A1* | 1/2023 | Vianello | G06Q 30/0278 |
| 2023/0215128 | A1* | 7/2023 | Ranganathan | G06V 10/273<br>382/103 |
| 2023/0216999 | A1* | 7/2023 | Zobel | G06T 5/60<br>348/42 |
| 2023/0310998 | A1* | 10/2023 | Starke | G06T 13/80<br>463/31 |

OTHER PUBLICATIONS

Xie et al., "Physics-Based Human Motion Estimation and Synthesis from Videos" (Year: 2021).*
Habermann et al., "Real-time Deep Dynamic Characters" (Year: 2021).*
Stroll et al., "Video-Based Reconstruction of Animatable Human Characters" (Year: 2010).*
U.S. Appl. No. 18/159,815, filed Jan. 26, 2023, Nvidia Corporation.
U.S. Appl. No. 18/181,729, filed Mar. 10, 2023, Nvidia Corporation.
U.S. Appl. No. 18/193,982, filed Mar. 31, 2023, Nvidia Corporation.
U.S. Appl. No. 18/322,319, filed May 23, 2023, Nvidia Corporation.
U.S. Appl. No. 18/465,363, filed Sep. 12, 2023, Nvidia Corporation.

* cited by examiner

DETERMINE, USING VIDEO SEQUENCE, MESH SEQUENCE CORRESPONDING TO MOTION OF EACH OF AT LEAST ONE DYNAMIC CHARACTER OF ONE OR MORE DYNAMIC CHARACTERS AND MESH OF TERRAIN
B202

DETERMINE USING GENERATIVE MODEL AND BASED AT LEAST ON MESH SEQUENCE AND MESH OF TERRAIN, OCCLUSION-FREE MOTION OF AT LEAST ONE DYNAMIC CHARACTER BY INFILLING PHYSICS PLAUSIBLE CHARACTER MOTIONS IN MESH SEQUENCE FOR AT LEAST ONE FRAME OF VIDEO SEQUENCE THAT INCLUDES OCCLUSION OF AT LEAST PORTION OF AT LEAST ONE DYNAMIC CHARACTER
B204

DETERMINE PHYSICS PLAUSIBLE WHOLE HUMAN MOTION OF AT LEAST ONE DYNMAIC CHARACTER BY APPLYING PHYSICS-BASED IMITATION UPON OCCLUSION-FREE MOTION
B206

UPDATE GENERATIVE MODEL TO GENERATE, USING AS INPUTS MESH SEQUENCE OF MOTION OF ONE OR MORE DYNAMIC CHARACTERS AND MESH OF TERRAIN OF VIDEO SEQUENCE, OCCLUSION-FREE MOTION OF EACH DYNAMIC CHARACTER BY INFILLING PHYSICS-PLAUSIBLE CHARACTER MOTIONS IN MESH SEQUENCE FOR ONE OR MORE OCCLUDED FRAMES
B502

UPDATE HIGH-LEVEL CONTROLLER
B504

UPDATE MOTION MODEL
B506

UPDATE FIRST PHYSICS-BASED MOTION IMITATOR
B508

UPDATE SECOND PHYSICS-BASED MOTION IMITATOR
B510

FIG. 5

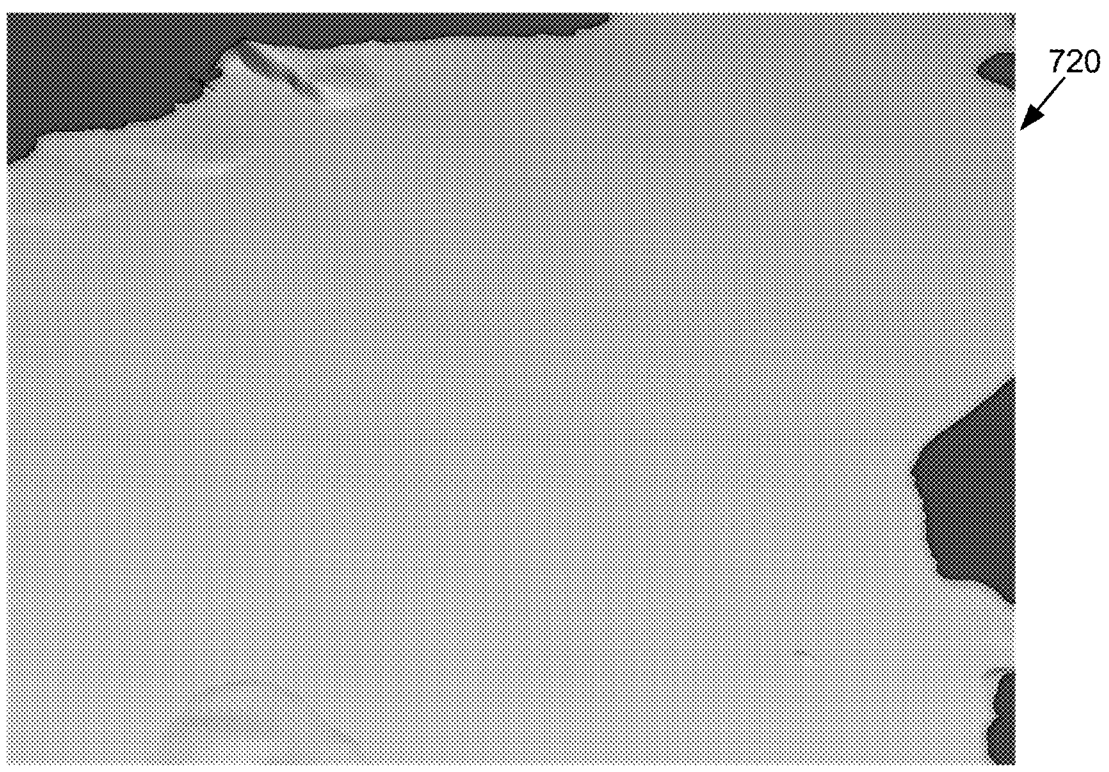
FIG. 7

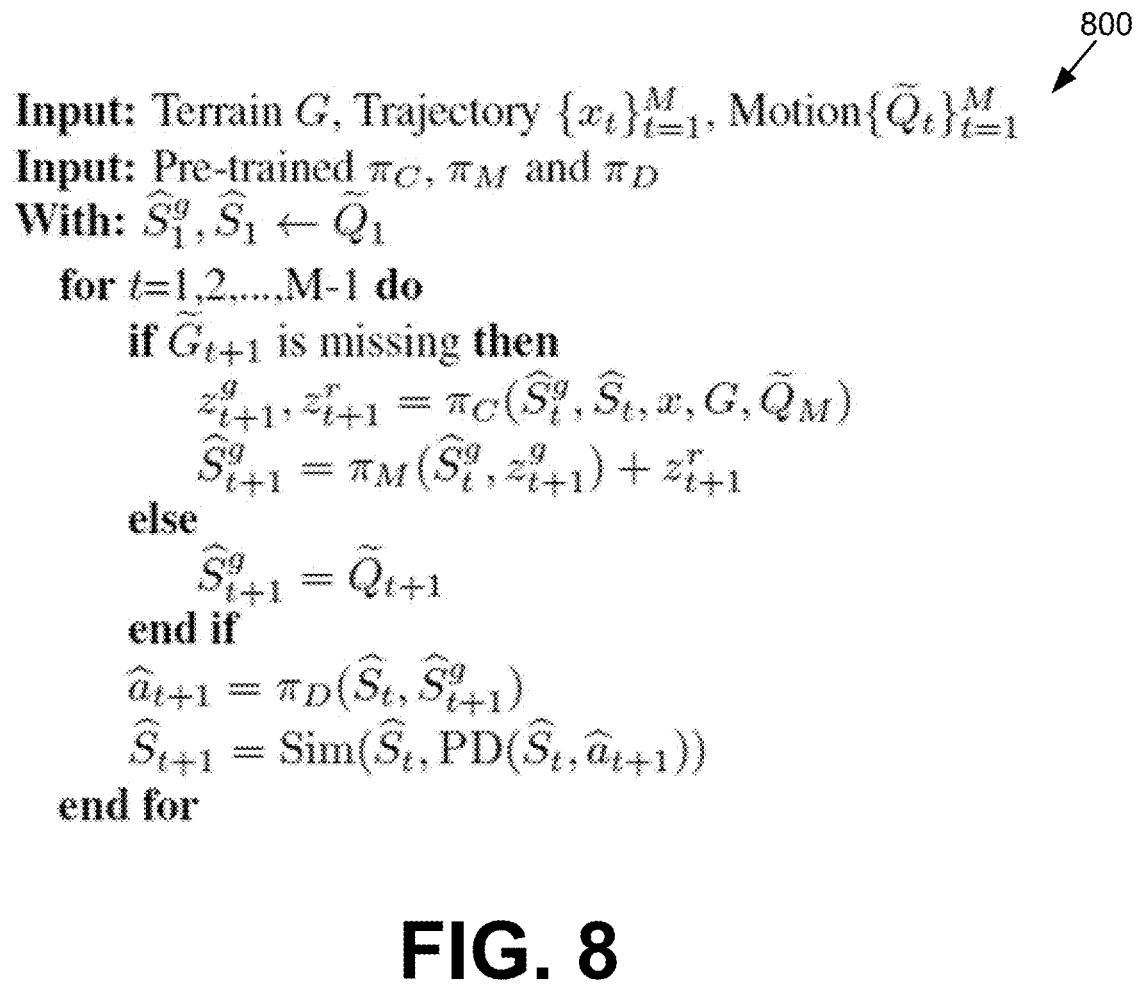

800

Input: Terrain $G$, Trajectory $\{x_t\}_{t=1}^{M}$, Motion$\{\widetilde{Q}_t\}_{t=1}^{M}$
Input: Pre-trained $\pi_C$, $\pi_M$ and $\pi_D$
With: $\widehat{S}_1^g, \widehat{S}_1 \leftarrow \widetilde{Q}_1$ for $t$=1,2,....,M-1 do
  if $\widetilde{G}_{t+1}$ is missing then
    $z_{t+1}^g, z_{t+1}^r = \pi_C(\widehat{S}_t^g, \widehat{S}_t, x, G, \widetilde{Q}_M)$
    $\widehat{S}_{t+1}^g = \pi_M(\widehat{S}_t^g, z_{t+1}^g) + z_{t+1}^r$
  else
    $\widehat{S}_{t+1}^g = \widetilde{Q}_{t+1}$
  end if
  $\widehat{a}_{t+1} = \pi_D(\widehat{S}_t, \widehat{S}_{t+1}^g)$
  $\widehat{S}_{t+1} = \mathrm{Sim}(\widehat{S}_t, \mathrm{PD}(\widehat{S}_t, \widehat{a}_{t+1}))$
end for

FIG. 8

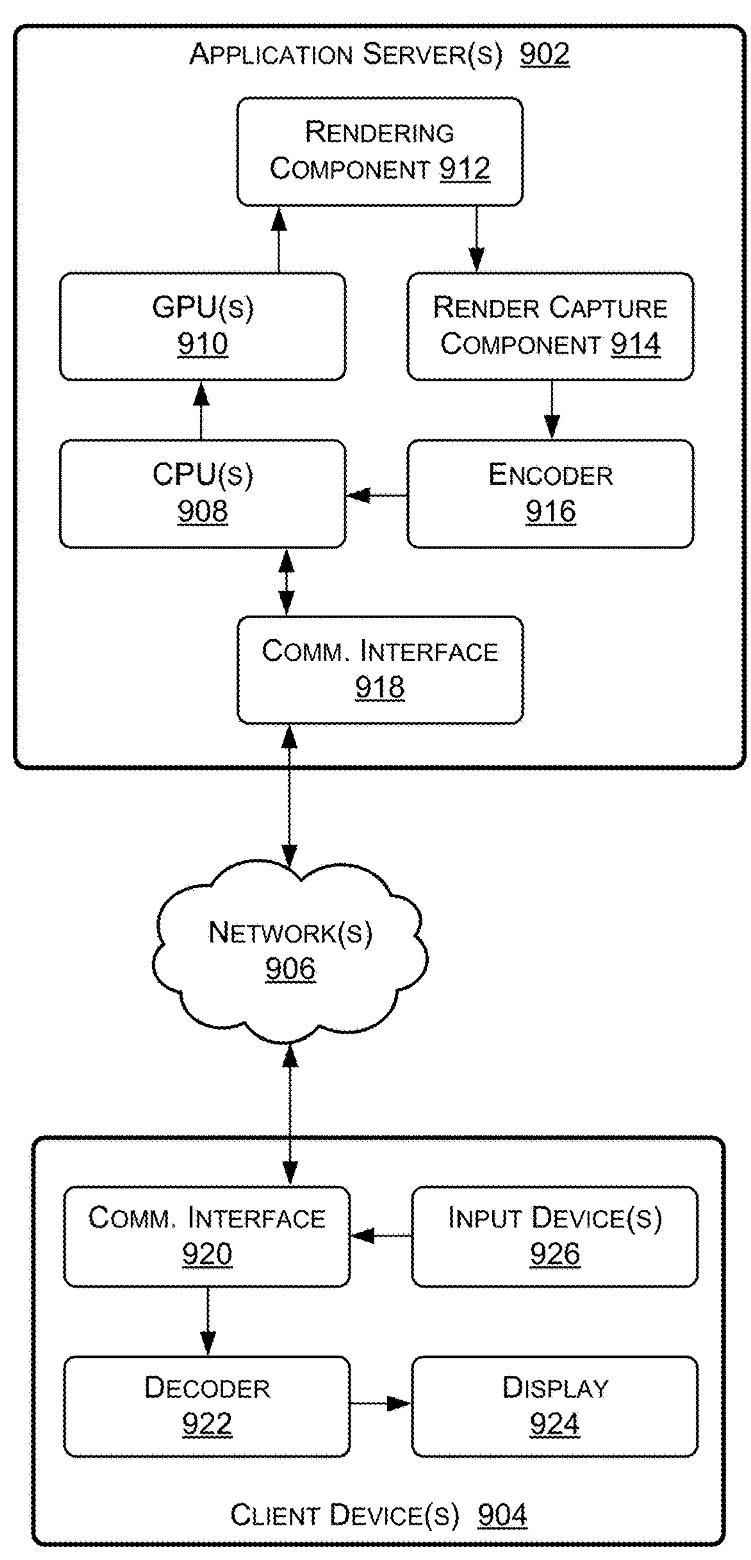
FIG. 9

CHARACTER SIMULATION

CROSS-REFERENCE TO RELATED APPLICATIONS

The present application claims the benefit of and priority to U.S. Provisional Application No. 63/423,441, filed Nov. 7, 2022, the disclosure of which is incorporated herein by reference in its entirety.

BACKGROUND

Understanding human behaviors is essential to improving the safety of Autonomous Vehicles (AVs) operating in environments with potential human interactions. For instance, AVs need to understand the human behaviors (e.g., possible human movements) and human geometries in order to avoid collision with the humans (e.g., pedestrians) and to improve the comfort of passengers. Simulations have become an indispensable tool for scaling and accelerating development of self-driving systems, including Artificial Intelligence (AI) drivers of AVs. Simulations can imitate real-life dynamic (e.g., human characters, animals, other road users) and stationary (e.g., buildings, infrastructure, and scenery) objects of an environment or scene to train the AI drivers on obstacle avoidance, path following, decision making, safety compliance, and so on. High-quality human motions and meshes in the AV scenarios and context are needed to train AI drivers of AVs on human behaviors and human geometries.

However, presently, there is a gap between real-life human motions and simulated human motions and meshes. For example, conventional motion generation methods are troubled by foot sliding, ground penetration, and unnaturally infilled motions due to the domain gap between the indoor motion sequences (e.g., the source of the video sequence) and AV scenarios. Specifically, indoor motion sequences capture humans walking slowly and turning around, while pedestrian motions in AV scenarios are typically faster paced. Thus, simulated human motions in AV scenarios traditionally suffer from occlusion (e.g., long-term occlusion), ill-twisted poses, and physics-implausible movements within complex environments (e.g., penetrating or floating above uneven terrains or foot sliding), thus failing to support AI drivers in learning realistic human behaviors and geometries. Conventional motion generation methods capture the entire motion and mesh sequence of humans in order to introduce motion generation models for the occluded frames and have several drawbacks. For example, conventional methods such as conventional motion generation models consider only the kinematics physiological constraints (e.g., the joint limits) and ignore the physics plausibility (e.g., the ground penetration and the foot sliding). In addition, conventional motion generation models are trained using indoor or flat terrain dataset of images and videos of humans in indoor scenarios. The domain gap between indoor scenarios and AV scenarios (e.g., outdoor scenarios, traffic scenarios, and so on) is the cause of failure of conventional motion generation models to infill plausible trajectories and motions of simulated humans.

SUMMARY

Embodiments of the present disclosure are directed to reconstructing physics-plausible motion and mesh sequences of dynamic (e.g., human) characters in various scenarios such as AV driving scenarios. The physics-plausible motion and mesh sequences of dynamic characters are reconstructed from only visible annotation, for both visible and occluded parts of a dynamic character. Some embodiments relate to a three-stage framework for reconstructing physics-plausible motion and mesh sequences of dynamic characters in AV driving scenarios. In the first stage, the observed dynamic character motions and terrain meshes are captured and processed for two subsequent physics-based stages. In the second stage, motions and meshes for the occluded frames can be infilled by a motion generation framework, which optimizes both the visible and occluded motions within a physics-based framework. In the third stage, the entire motion sequence can be optimized to match the video evidence (e.g., 2D key points with high confidence) to ameliorate or close the gap between generated and observed motions. Embodiments of the present disclosure can recover high quality meshes and motion sequences while outperforming prior methods, most significantly on occluded portions of a dynamic character (model).

At least one aspect relates to a processor. The processor can include one or more circuits to determine a mesh sequence (e.g., triangle mesh ($\Phi$) of motion (e.g., Q) of one or more dynamic characters and a mesh of a terrain using a video sequence. The one or more circuits can determine (using a generative model—including one or more of local motion generator, physics-based motion imitator, high-level controller—the mesh sequence, and the mesh), an occlusion-free motion of the one or more dynamic characters by infilling physics-plausible character motions in the mesh sequence for occluded frames of the video sequence. The generative model includes one or more of local motion generator, physics-based motion imitator, high-level controller. The one or more circuits can determine physics-plausible whole body motions (e.g., $\overline{Q}$) by applying physics-based imitation upon the occlusion-free motion.

In some examples, the motion is defined by one or more of a root translation, a root rotation, a body motion, or a body shape. In some examples, the motion is defined by a global orientation for one of an occluded frame, a beginning frame, or an ending frame. In some examples, the one or more circuits can determine the mesh of the terrain by reconstructing the terrain using LiDAR point clouds.

In some examples, the one or more circuits can infill the physics-plausible dynamic character motions in the mesh sequence for the occluded frames of the video sequence by infilling the physics-plausible dynamic character motions between two occlusion-free frames of the video sequence. In some examples, the one or more circuits can implement a local motion generator to generate a local motion from a current frame to a next frame using a kinematics policy according to at least one of a root translation, a root orientation, a body pose, a joint position, a velocity of translation, a velocity of rotation, or a velocity of joints of each of the one or more dynamic characters. In some examples, the one or more circuits can implement a high-level controller that maps the local motion to an interpolated trajectory and to motion-match the local motion to at least one visible pose. The high-level controller provides latent code for the kinematics policy. In some examples, the one or more circuits can implement a physics-based motion imitator to contact the local motion to the terrain by imitating a target pose using a dynamics policy.

In some examples, the one or more circuits can determine penetration free contact of the one or more dynamic characters with the terrain. In some examples, the one or more circuits can determine the physics-plausible dynamic character motions by applying at least one policy (e.g., $\pi_K$) upon the occlusion-free motion, and adjust the physics-plausible dynamic character motions using a residual parameter.

At least one aspect relates to a processor. The processor can include one or more circuits to update a generative model to generate (using a mesh sequence of motion of one or more dynamic characters and a mesh of a terrain of a video sequence as inputs) an occlusion-free motion of the one or more dynamic characters by infilling physics-plausible dynamic character motions in the mesh sequence for occluded frames of the video sequence.

In some examples, the generative model includes a high-level controller to map a local motion to an interpolated trajectory and to motion-match the local motion to at least one visible pose. Updating the generative model includes updating the high-level controller. In some examples, the high-level controller is updated using a proximal policy optimization (PPO) algorithm. In some examples, the high-level controller is updated according to at least one of a trajectory reward or an infill reward.

In some examples, the one or more circuits can pre-train the high-level controller using synthesized terrains and synthesized trajectories for corresponding the local motion to the interpolated trajectory and pre-train the high-level controller using a dataset of motion capture (e.g., Archive of Motion Capture As Surface Shapes (AMASS) dataset) to motion-match the local motion to the at least one visible pose.

In some examples, the generative model includes a local motion generator to generate a local motion from a current frame to a next frame using a kinematics policy according to at least one of a root translation, a root orientation, a body pose, a joint position, a velocity of translation, a velocity of rotation, or a velocity of joints of each of the one or more dynamic characters. Updating the generative model includes updating the local motion generator to implement the kinematics policy.

In some examples, the generative model includes a physics-based motion imitator to ensure a local motion maintains physics-accurate physical contact with terrain by imitating a target pose using a dynamics policy. Updating the generative model includes updating the physics-based motion imitator to implement the dynamics policy.

In some examples, a method includes determining a mesh sequence of motion of one or more dynamic characters and a mesh of a terrain using a video sequence, determining (e.g., using a generative model, the mesh sequence, and the mesh), an occlusion-free motion of the one or more dynamic characters by infilling physics-plausible character motions in the mesh sequence for occluded frames of the video sequence, and determining physics-plausible whole body motions by applying physics-based imitation upon the occlusion-free motion.

In some examples, the method includes infilling the physics-plausible dynamic character motions in the mesh sequence for the occluded frames of the video sequence by infilling the physics-plausible dynamic character motions between two occlusion-free frames of the video sequence. In some examples, the method includes determining the physics-plausible dynamic character motions by applying at least one policy upon the occlusion-free motion and adjusting the physics-plausible dynamic character motions using a residual parameter.

The processors, systems, and/or methods described herein can be implemented by or included in at least one of a system associated with an autonomous or semi-autonomous machine (e.g., an in-vehicle infotainment system); a system for performing simulation operations; a system for performing digital twin operations; a system for performing light transport simulation; a system for performing collaborative content creation for 3D assets; a system for performing deep learning operations; a system implemented using an edge device; a system implemented using a robot; a system for generating or presenting virtual reality (VR) content, augmented reality (AR) content, and/or mixed reality (MR) content; a system for performing conversational AI operations; a system for performing generative AI operations using a large language model (LLM), a system for generating synthetic data; a system incorporating one or more virtual machines (VMs); a system implemented at least partially in a data center; or a system implemented at least partially using cloud computing resources.

BRIEF DESCRIPTION OF THE DRAWINGS

The present systems and methods for controllable trajectory generation using neural network models are described in detail below with reference to the attached drawing figures, wherein:

FIG. 2 is a flow diagram showing a method for generating physics-plausible whole body motions, in accordance with some embodiments of the present disclosure.

FIG. 5 is a flow diagram showing a method for training a machine learning model for generating physics-plausible whole body motions, in accordance with some embodiments of the present disclosure.

FIG. 7 illustrates an example pre-processed terrain and an example post-processed terrain, according to various embodiments of the present disclosure.

FIG. 8 is a flow diagram illustrating an example method for generating a mesh of the terrain, according to various arrangements.

FIG. 9 is a block diagram of an example content streaming system suitable for use in implementing some embodiments of the present disclosure.

DETAILED DESCRIPTION

Figure 1:
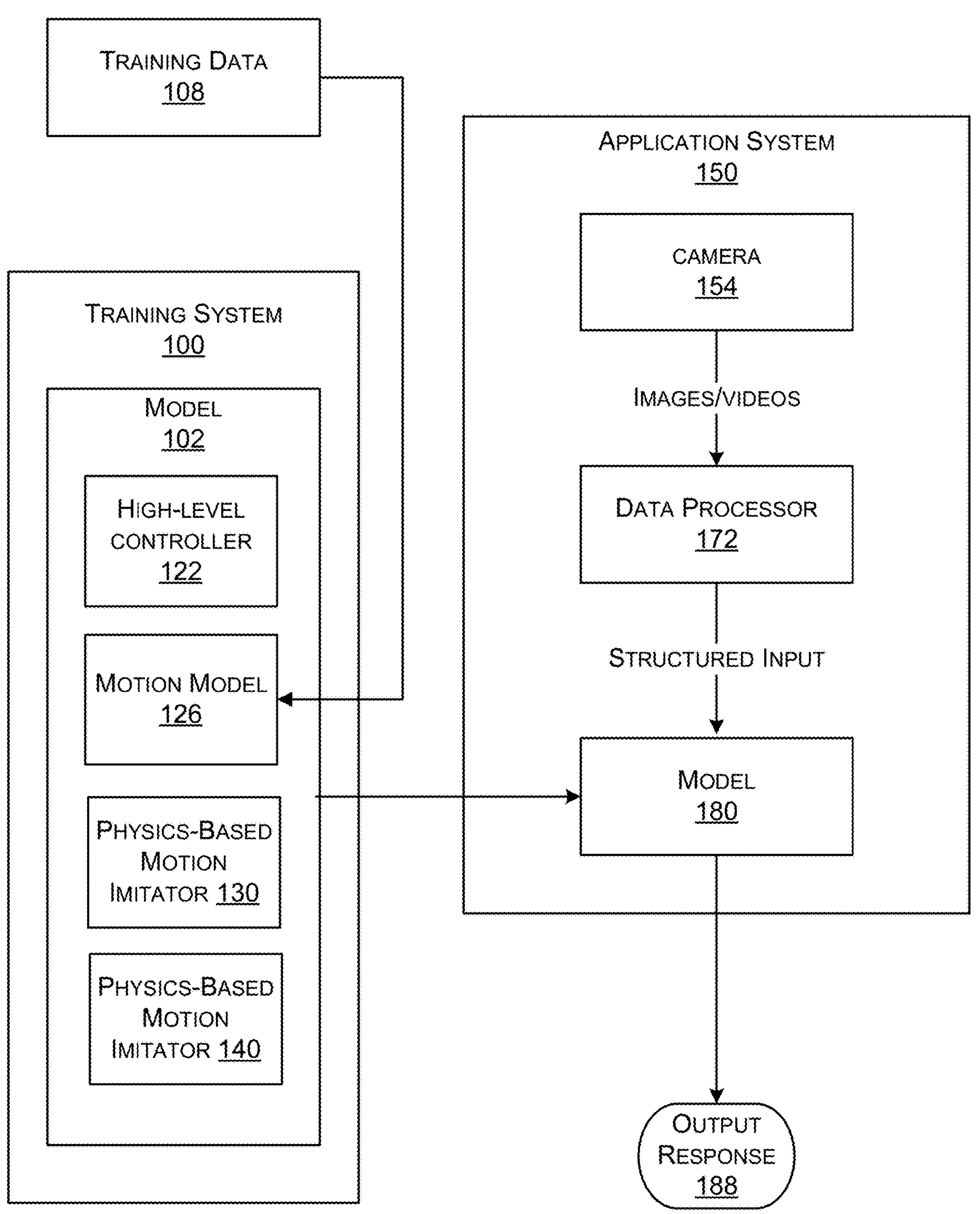
FIG. 1 is a block diagram of an example computing environment for training and operating machine learning models.

Embodiments of the present disclosure relate to systems, methods, non-transitory computer-readable media, and apparatuses for generating physics-plausible whole body motions in simulations by incorporating physics and a reinforcement learning-based motion controller into c meshes and motion recovery. Physics-plausible whole body motion and mesh sequences (for both visible and occluded frames) of the (e.g., human) characters can be recovered, even under challenging scenarios. To address the problems presented by existing approaches, the physics-plausible whole body motion and mesh sequences can be recovered under dynamic camera capture and reconstruction in AV scenarios.

In some examples, motion capturing and scene reconstruction (e.g., Poisson Surface Reconstruction) methods can be incorporated to obtain the observation of motions in visible frames, as well as the mesh of terrain. Thereafter, these observations are processed using physics-based methods, including (for example and without limitation): filtering low-confidence motion observations, fixing missing terrain for the observed trajectories, and so on. After this, a physics-based motion controlling method is applied to infill motions of the dynamic characters for the occluded frames. The visible frames are tracked to ensure physics-plausibility (e.g., to ensure penetration-free contact against the ground). The task of motion controlling is to infill motions following the trajectory, which is interpolated by the global translations of these two frames, as well as matching the motion of the last visible frame. In contrast to conventional methods which infills a few of missing frames together by a pre-trained transformer based model, the embodiments of the present disclosure treat motion infilling task between two visible frames as the local motion controlling task based on the local motion generator and high-level controller. According to some embodiments, a Conditional Variational Auto-encoder (CVAE) can be trained as the local motion generator, and a high-level controller is trained for sampling specific latent codes for this CVAE model to finish these proposed tasks. A physics-based imitator may be deployed upon the entire motion sequence during the infilling to ensure that the dynamic characters can walk on the reconstruction ground with correct (e.g., physics-plausible) foot contact.

A controlling-style motion infilling framework such as those in accordance with one or more embodiments of the present disclosure improves over conventional methods because the motion is generated frame-by-frame and efficiently for interacting with the environment, and is able to adapt motions to uneven terrains. Beyond the indoor dataset, several scenarios can be synthesized with similar terrains and motion trajectories as AV scenarios to train the high-level controller for adapting to the real-world motions. An additional joint optimization can used with the physics-based imitator and generated motion to match video evidence (e.g., 2D key points with high confidence) to further improve the quality of captured motion. Based on this framework, the physics-plausible entire motion and mesh sequences of dynamic characters in the AV scenarios can be recovered.

A method includes capturing physics-plausible whole body motions and mesh sequences in AV scenarios for both visible and occluded parts of dynamic characters. The method includes motion infilling to generate physics-plausible motions of dynamic characters for the occluded frames in driving scenarios. Training of the motion generation model can be performed using indoor motion data of dynamic characters, such as (for example and without limitation): humans, animals, or robots or other machines, etc.

FIG. 1 illustrates an example computing environment including a training system 100 and an application system 150 for training and deploying machine learning models, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The training system 100 can train or update one or more machine learning models, such as the model 102.

The model 102 can include one or more neural networks. A neural network can include an input layer, an output layer, and/or one or more intermediate layers, such as hidden layers, which can each have respective nodes. As described herein, the model 102 (e.g., the machine learning model 420) can include a high-level controller 122, a motion model 126, a physics-based motion imitator 130 (e.g., referred to as a first physics-based motion imitator), and a physics-based motion imitator 140 (e.g., referred to as a second physics-based motion imitator).

Each of the high-level controller 122, the motion model 126, the physics-based motion imitator 130, and the physics-based motion imitator 140 can include one or more neural networks, transformers, recurrent neural networks (RNNs), long short-term memory (LSTM) models, CNNs, other network types, or various combinations thereof. The neural network can include an input layer, an output layer, and/or one or more intermediate layers, such as hidden layers, which can each have respective nodes. For example, each of the high-level controller 122, the physics-based motion imitator 130, and the physics-based motion imitator 140 includes a multi-layer perception (MLP), for example, having a layer number of 3, with the output dimension for the first two layers being 1024, and the last one layer being 512.

The training system 100 can update (e.g., train) the model 102 (or any components thereof) by modifying or updating one or more parameters, such as weights and/or biases, of various nodes of the neural network responsive to evaluating candidate outputs of the model 102. The output of the model 102 can be used to evaluate whether the model 102 has been trained/updated sufficiently to satisfy a target performance metric, such as a metric indicative of accuracy of the model 102 in generating outputs. Such evaluation can be performed based on various types of loss and/or reward. For example, the training system 100 can use a function such as a loss function and/or a reward function to evaluate a condition for determining whether the model 102 is configured (sufficiently) to meet the target performance metric. The condition can be a convergence condition, such as a condition that is satisfied responsive to factors such as an output of the function meeting the target performance metric or threshold, a number of training iterations, training of the model 102 converging, or various combinations thereof.

The application system 150 can operate or deploy a model 180 to generate or provide output response 188 corresponding to physics-plausible whole body motions. The application system 150 can be implemented by or communicatively coupled with the training system 100, or can be separate from the training system 100. The model 180 can be or be received as the model 102, a portion thereof, or a representation thereof. For example, a data structure representing the model 102 can be used by the application system 150 as the model 180. The data structure can represent parameters of the trained or updated model 102, such as weights or biases used to configure the model 180 based on the training or updating of the video diffusion model 110.

The camera 154 can be provided in the application system 150 for capturing images or videos. The camera 154 can be a dynamic camera on a vehicle (e.g., a fast-moving camera on a fast-moving vehicle) or a stationary camera fixed at a given location. The output of the camera 154 can be the video sequence as described herein. The data processor 172 can process the video sequence by generating structured input, including a mesh sequence of the motion of each dynamic character and a mesh of the terrain, in the manner described herein.

FIG. 2 is a flow diagram showing a method 200 for generating physics-plausible whole body motions, in accordance with some embodiments of the present disclosure. Each block of method 200, described herein, includes a computing process that may be performed using any combination of hardware, firmware, and/or software. For instance, various functions may be carried out by a processor executing instructions stored in memory. The method 200 may also be embodied as computer-usable instructions stored on computer storage media. The method 200 may be provided by a standalone application, a service or hosted service (standalone or in combination with another hosted service), or a plug-in to another product, to name a few. In addition, method 200 is described, by way of example, with respect to the systems of FIG. 1. However, this method 200 may additionally or alternatively be executed by any one system, or any combination of systems, including, but not limited to, those described herein.

At B202, using a video sequence, the data processor 172 determines a mesh sequence corresponding to the motion $\tilde{Q}$ of each of at least one dynamic characters of one or more dynamic characters and a mesh of the terrain G. The video sequence is the input to the data processor 172, which outputs the mesh sequence of the motion of each of one or more dynamic characters and the mesh of the terrain. In other words, at B202, 3-dimensional (3D) character pose and shape estimation and terrain reconstruction are performed. The physics-plausible dynamic motions and the terrain are prepared, e.g., the initial observation is determined or otherwise prepared for physics simulation. The motion 0 refers to captured dynamic character motion (e.g., human or other dynamic character motion sequences, meshes, mesh sequences, and so on) of a dynamic character in visible frames.

In some examples, captured motions of real-life humans or other dynamic characters from a video sequence can often be partially occluded by dynamic objects (e.g., vehicles, other humans, and so on), static objects (e.g., buildings, infrastructure, and so on), leading to low-quality poses that are not suitable for physics-based reasoning. For example, due to frequently occurring occlusions in driving scenarios, captured human motions may not always be complete. That is, given at least a portion of one or more dynamic characters captured by the video sequence may be occluded from the view of the camera, the resulting captured human motions may be noisy for physics simulation. To address such issues, occluded frames are filtered out by 2-dimensional (2D) pose confidence score. Physics-based priors infill motions for these occluded frames in later stages.

In some embodiments, the video sequence can include a monocular video sequence $I=(I_1, \ldots, I_T)$ with T frames. In some examples, the video sequence is captured by a camera. In some examples, the camera can be a dynamic camera on a vehicle (e.g., a fast-moving camera on a fast-moving vehicle) or a stationary camera fixed at a given location.

In some embodiments, the video sequence is used to estimate physics-plausible character motion $$\{Q^i\}_{i=1}^N$$

(e.g., physics-plausible dynamic motion sequences, and so on) for both visible and occluded frames of N characters in the world-coordinate system defined for the video sequence. Then, for each character, the motion Q is defined as:

$$Q=(T, R, \Theta, B), \tag{1}$$

where $T=(\tau_s, \ldots, \tau_e)$ denotes root translation, $R=(r_s, \ldots, r_e)$ denotes root rotation, $\tau=(\Theta_s, \ldots, \Theta_e)$ denotes body motions, and $B^i=(b_s, \ldots, b_e)$ body shape, from the first frame s to the last frame e. The definitions of the root translation $\tau_t \in R^3$, root orientation $r_t \in R^3$, body pose $\Theta_t \in R^{23\times3}$, and body shape $b_t \in R^{10}$ can include the definitions included in skinned multi-person linear (SMPL) model. The motion Q of a dynamic character can be defined by and can also refer to a mesh or mesh sequence of that dynamic character. A mesh, such as an articulated triangle mesh $\Phi \in R^{K\times3}$ (e.g., with K=6890 vertices with the SMPL model) of each dynamic character can be determined using the video sequence. Each mesh element of the mesh can also include other polygons, such as quadrilaterals, pentagons, hexagons, and so on. A mesh sequence for a dynamic character is a sequence of meshes (e.g., positions of the mesh elements) moving according to the motion of the dynamic character. The mesh (e.g., the articulated triangle mesh $\Phi \in R^{K\times3}$) can be the input to the framework.

As used herein, $\tilde{Q}$ refers to dynamic character motion (e.g., dynamic character motion sequences, meshes, mesh sequences, and so on) of a dynamic character in visible frames. $\hat{Q}$ refers to infilled dynamic character motion (e.g., infilled dynamic character motion sequences, infilled meshes, infilled mesh sequences, and so on) of a dynamic character in occluded frames. $\overline{Q}$ refers to physics-plausible whole body motion (e.g., physics-plausible whole body motion sequences, whole dynamic character meshes, whole dynamic character mesh sequences, final motion, output motion, and so on) of a dynamic character. Each of $\tilde{Q}$, $\hat{Q}$, $\overline{Q}$, can be defined in the manner in which Q is defined, e.g., in expression (1).

The dynamic character motion $\tilde{Q}$ of visible frames is estimated based on the input video sequence for each dynamic character and ground truth 3D bounding box for each dynamic character. The occluded frames can be filtered according to the score of the 2D pose estimation. Therefore, B204 and B206 not only recover the motions in the missing frames, but can also complete these partial occluded frames with low confidence pose estimation. The captured motions of a dynamic character for the beginning and ending frames for that dynamic character are at least partially outside the camera's field of view (FoV). That is, at least a part of a dynamic character may be outside of the FoV of the camera and thus not captured in the video sequence. This can cause incorrect root orientations in the resulting captured motion. For occluded, beginning, and ending frames, the captured motion can include global orientation $(r_S, r_e)$ adopted following the captured trajectory for better generation results.

The terrain quality may be limited by the occlusions in the driving scenarios. That is, occlusions and moving cameras often cause a terrain mesh generated using a video sequence to include holes and uneven surfaces. In terrain reconstruction, the mesh of terrain G for each video sequence can be reconstructed by Poisson Surface Reconstruction with light detection and ranging (LiDAR) point clouds. In some examples, the LiDAR point clouds can be generated based on LiDAR information captured by LiDAR on the vehicle or another object (dynamic or stationary) on which the camera used to capture the video sequence is located. Terrain reconstruction includes infilling the holes in the terrain, smoothing the terrain mesh, ensuring support by the terrain for each dynamic character in the video sequence, and so on. The quality of the reconstructed terrain mesh corresponds to the point cloud density captured by LIDAR. That is, the higher the point cloud density, the higher the quality of the reconstructed terrain mesh. Some captured motions may still lack the correct terrain from this reconstruction. For example, FIG. 7 illustrates an example pre-processed terrain 710 and an example post-processed terrain 720, according to various embodiments. As shown, after processing at B202, the complete and smooth terrain 720 for character simulation can be obtained.

Figure 3:
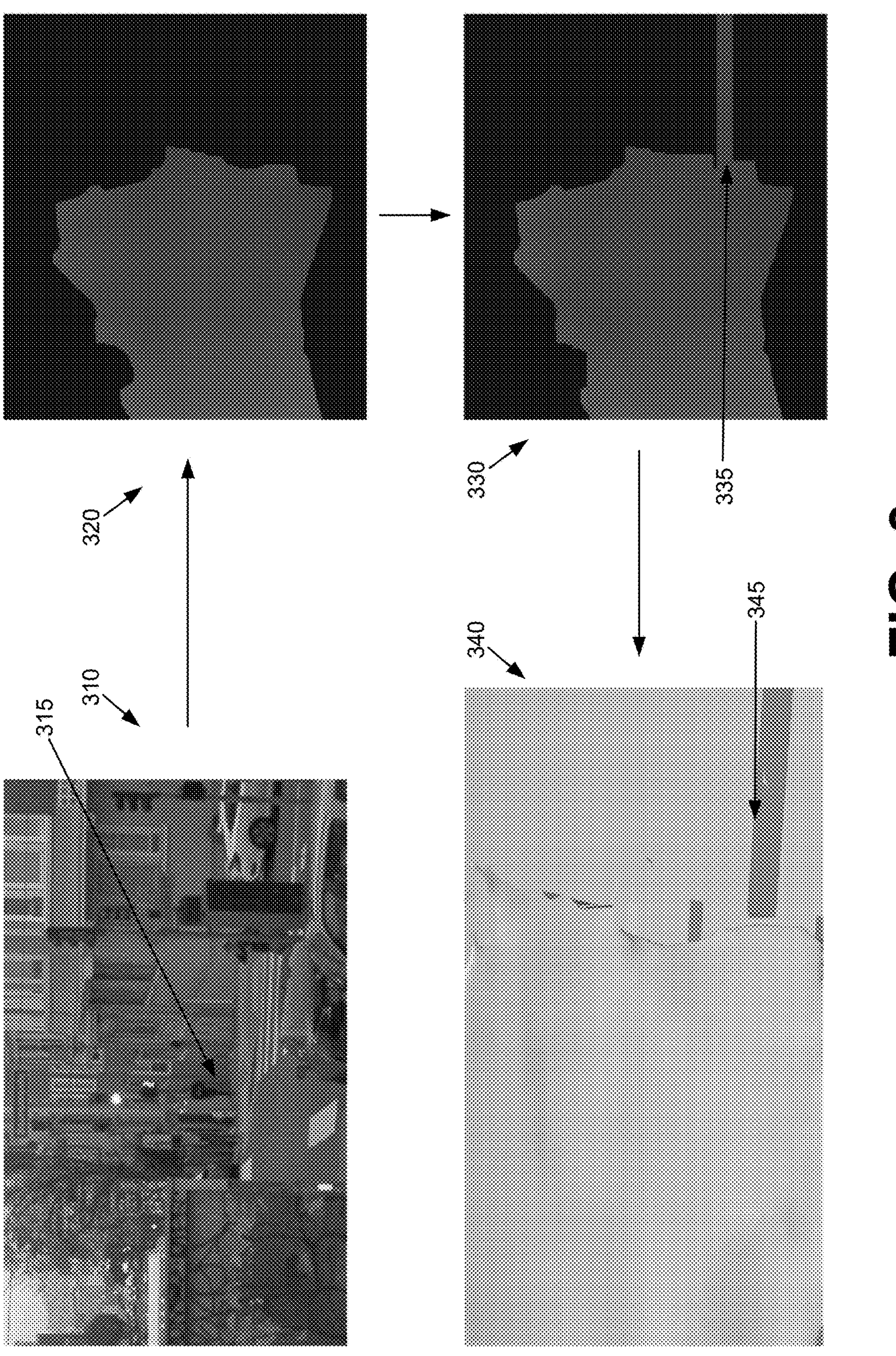
FIG. 3 is a flow diagram illustrating an example method for generating a mesh of the terrain, according to various arrangements.

FIG. 3 is a flow diagram illustrating an example method for generating a mesh of the terrain, according to various embodiments. An initial reconstructed mesh of a terrain can be generated using a video sequence 310 (e.g., represented in FIG. 3 as a frame thereof). As shown, a moving dynamic character 315 can cause occlusions on the terrain by block a part of the terrain from the FoV of the camera that captured the video sequence 310. The initial reconstructed mesh can be converted into height map 320, for example, using Poisson Surface Reconstruction. The height map 320 fails to take into account the occluded portion of the terrain. A height map 330 can be generated from the height map 320 by infilling and expanding the height map 320 to cover the entire range of dynamic character motions (e.g., the motions of the dynamic character 315) captured in the video sequence 310. That is, the height map 320 is extrapolated to the motions that missed terrain contact corresponding to the motions. The height map 330 is converted back to a final mesh of the terrain.

At B204, a machine learning model (e.g., a generative model such as the model 180) can determine—e.g., using the mesh sequence, and the mesh—an occlusion-free motion of the at least one dynamic character characters by infilling physics-plausible character motions in the mesh sequence for at least one frame of the video sequence that includes an occlusion of at least a portion of the at least one dynamic character.

The machine learning model can determine, using the mesh sequence of the motion $\tilde{Q}$ of each of the one or more dynamic characters and the mesh of the terrain G, an occlusion-free motion of each of the one or more dynamic characters by infilling, in the mesh sequence of the motion $\tilde{Q}$ of each of the one or more dynamic characters, physics-plausible character motions (e.g., the infilled dynamic motion $\hat{Q}$) for occluded frames of the video sequence. That is, the machine learning model can simulate physics-plausible dynamic character motions for the occluded frames based on the mesh sequence of the motion $\tilde{Q}$ of each of the one or more dynamic characters and the mesh of the terrain G. For example, a physics-based generation framework is applied to address the occlusion issue of the motion $\tilde{Q}$ of each of the one or more dynamic characters to ensure that the estimated motion of the one or more dynamic characters can walk on the reconstructed terrains with correct foot contact. After the physics-based generation framework, the occlusion-free motion is obtained.

After the preparation for the capture motion $\tilde{Q}$ in the visible frames and reconstructed terrain G is completed at B202, the captured motion $\tilde{Q}$ is tracked to infill the occluded frames to ensure the physics-plausibility of the entire motion sequence (e.g., against issues such as penetration-free against the ground). For example, physics-plausible dynamic character motions $\{\hat{Q}_{t_1+1}, \hat{Q}_{t_2-1}\}$ are infilled between these two visible frames $(\tilde{Q}_{t_1}, \tilde{Q}_{t_2})$ for each occluded dynamic character motion clip or segment of the video sequence. For the visible frames, the generated infilled dynamic character motion $\hat{Q}$ can be walking on the reconstructed terrain G with correct foot contact and be penetration free against the ground, based on the initially observed motion $\tilde{Q}$.

Figure 4:
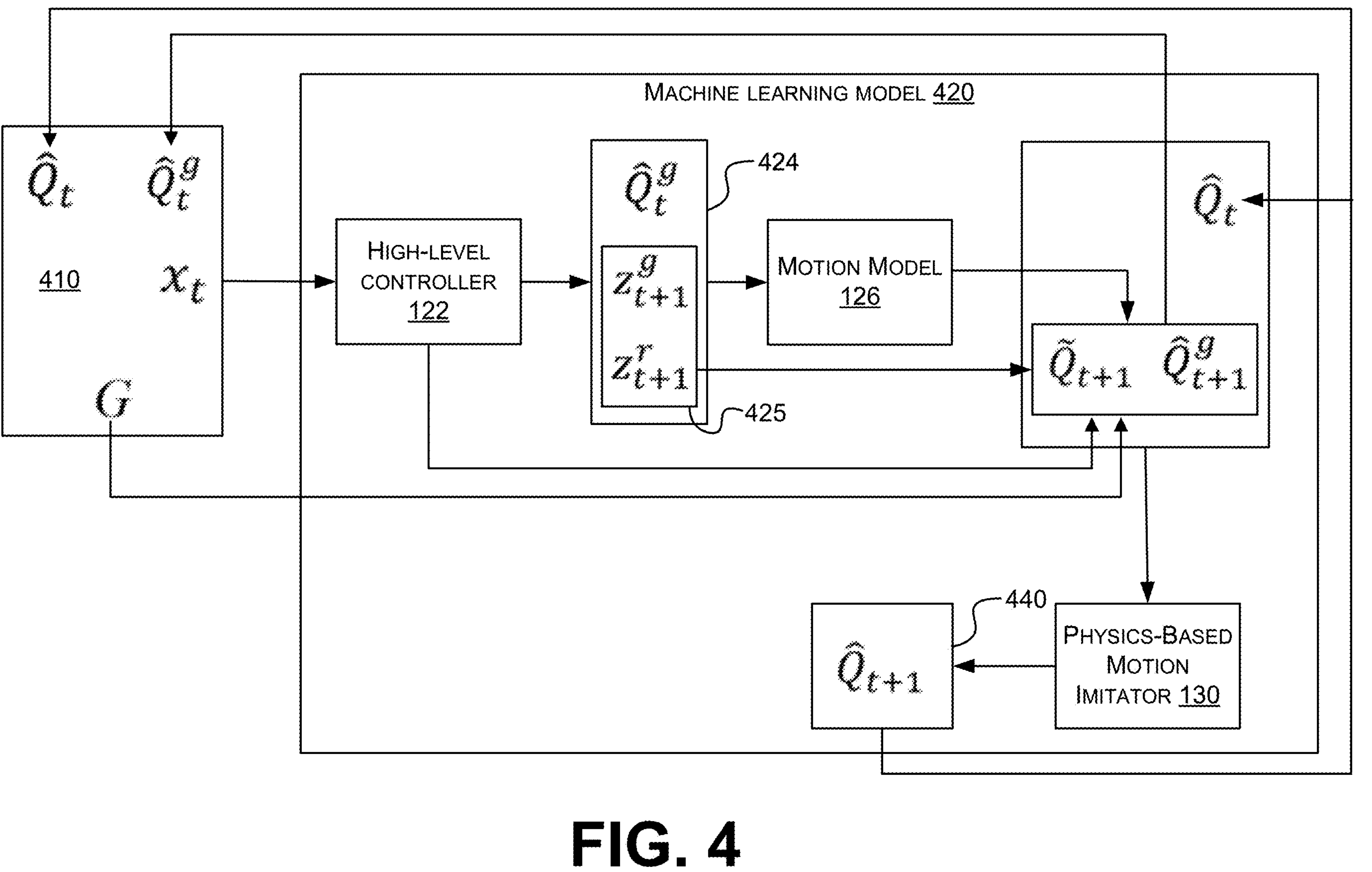
FIG. 4 is a block diagram illustrating an example machine learning model, according to various embodiments of the present disclosure.

FIG. 4 is a block diagram illustrating an example machine learning model 420, according to various embodiments of the present disclosure. The machine learning model 420 can be an example of the model 180 as implemented in the application system 150 in some examples. The machine learning model 420 can be an example of the model 102 updated, configured, or trained at the training system 100. In some examples, the machine learning model 420 includes a motion model 126 (e.g., a local motion generator) including or implementing kinematics policy $\pi_M$, a physics-based motion imitator 130 (e.g., a physics-aware imitator, a physics-aware humanoid controller, and so on) including or implementing dynamic policy $\pi_D$, and a high-level controller 122 (e.g., a high-level motion controller, a high-level latent space controller, and so on) including or implementing policy $\pi_C$ for $\pi_M$ and $\pi_D$. In some embodiments, each of the high-level controller 122, the motion model 126, and the physics-based motion imitator 130 is a machine learning model that can be updated, configured, or trained in the manner described herein. The high-level controller 122 and the motion model 126 can generate the infilled dynamic character motion $\hat{Q}$.

In general, the motion model 126 is a low-level generative motion transition model that can output infilled dynamic character motion $\hat{Q}$ based on sparse input (e.g., the input 410). The high-level controller 122 can sample from a controllable latent space. The high-level controller 122 then samples latent codes $$z_{t+1}^{g}$$

based on the input 410, including the mesh of terrain G, the input video observations at time t, a trajectory at time t($x_t$), and past states (e.g., generated motion at time $$t\hat{Q}_t^g$$

and simulated motion at time t $\hat{Q}_t$). The physics-based motion imitator 130 imitates the generated motion $$(\text{e.g., } \hat{Q}_{t+1}^{g})$$

in a physics simulator on reconstructed terrain G. Using the physics and dynamic character motion model, long sequences of occluded motions can be infilled, and the entire motion sequence is ensured to be physically-plausible and compatible with the terrain. The high-level controller 122 can generate local motion from a current frame to a next frame using a kinematics policy $\pi_M$ according to at least one of a root translation, a root orientation, a body pose, a joint position, a velocity of translation, a velocity of rotation, or a velocity of joints of each dynamic character.

For example, the motion model 126 is a one-step generative transition model that uses the parameters 424 as input and generates $$\hat{Q}^{g}_{t+1}$$

as output. The parameters 424 include generated motion at time $$t\ (\hat{Q}^{g}_{t})$$

and the parameters 425. The parameters 425 include latent code for $$t+1\ (z^{g}_{t+1})$$

and residuals for $$t+1\ (z^{r}_{t+1}).$$

The motion model 126 uses the previous pose at t (e.g., the generated motion $$\hat{Q}^{g}_{t})$$

and the latent code $$z^{g}_{t+1}$$

to generate $$\hat{Q}^{g}_{t+1}$$

for the next pose, at t+1. The kinematics policy $\pi_M$ implemented by the motion model 126 can be formulated by the CVAE to generate the local motion $$\hat{Q}^{g}_{t+1}$$

from the current observation at time step t to the next frame t+1. To infill the occluded motion from $t_1$ to $t_2$, between two visible frames $(\tilde{Q}_{t_1}, \tilde{Q}_{t_2})$, the motion state $\tilde{S}_{t_1}$ (corresponding to the captured motion $\tilde{Q}_{t+1}$) characterizing to initial observation of this policy can be defined as:

$$\tilde{S}_{t_1} = \left(\tilde{\tau}_{t_1}, \tilde{r}_{t_1}, \tilde{\theta}_{t_1}, \tilde{J}_{t_1}, \tilde{\dot{\tau}}_{t_1}, \tilde{\dot{r}}_{t_1}, \tilde{\dot{J}}_{t_1}\right), \tag{2}$$

using elements that respectively correspond to the root translation, root orientation, body pose, joint position, the velocity of translation, velocity of rotation, and the velocity of joints, at $t_1$. The generated motion state $$\hat{S}^{g}_{t+1}$$

(corresponding to the motion $$\left(\text{corresponding to the motion } \hat{Q}^{g}_{t+1}\right)$$

for the next pose at $t_1$+1 can be defined as:

$$\hat{S}^{g}_{t_1+1} = \left(\hat{\tau}^{g}_{t_1+1}, \hat{r}^{g}_{t_1+1}, \hat{\theta}^{g}_{t_1+1}, \hat{J}^{g}_{t_1+1}, \hat{\dot{\tau}}^{g}_{t_1+1}, \hat{\dot{r}}^{g}_{t_1+1}, \hat{\dot{J}}^{g}_{t_1+1}\right), \tag{3}$$

which likewise correspond to the root translation, root orientation, body pose, joint position, the velocity of translation, velocity of rotation, and the velocity of joints, respectively. The motion state $$\hat{S}^{g}_{t_1+1}$$

for the occluded frame $t_1$+1 can be generated using:

$$\hat{S}^{g}_{t_1+1} = \pi_M(\tilde{S}_{t_1}, z_{t_1+1}), \tag{4}$$

by sampling latent code $z_{t_1}$. With this policy, $t_2-t_1-1$ step motions may be generated step-by-step for motion infilling.

This generated motion and motion state may not be directly used as the infilling results for the infilled dynamic character motion $\hat{Q}$. Output motions of CVAE can be sampled randomly, and thus the generated motions may not be directly used as the infilled dynamic character motion $\hat{Q}$, subject to the random sampling. The motion model 126 can be trained by videos capturing indoor motion using an indoor motion capture system and/or on flat terrain in some examples. In some examples, the motion model 126 can be trained by videos capturing outdoor motion using an outdoor motion capture system (e.g., in AV scenarios).

In some examples, for visible frames, the observed pose corresponding to $\tilde{Q}_{t+1}$ is provided to the physics-based motion imitator 130 instead of using the motion model $\pi_M$. For occluded frames, the high-level controller 122 is used to generate the latent code $z_{t+1}$ for the motion model 126 to control the dynamic character's motion and infills a coherent motion $\hat{Q}$ between the visible frames. The high-level controller 122 can be deployed to ensure that the generated infilled dynamic character motion $\hat{Q}$ of a dynamic character is able to walk along the interpolated trajectory $x_t$ between two visible frames $(\tilde{Q}_{t_1}, \tilde{Q}_{t_2})$.

For a visible frame at t+1, the motion $Q_{t+1}$ is adapted to the mesh of the reconstructed terrain G by adjusting the height of the mesh of the reconstructed terrain G. For the visible frames, the high-level controller 122 can directly use the adjusted captured motion $\tilde{Q}_{t+1}$ as the imitation target for $\pi_D$, rather than predicting the latent codes for $\pi_M$. The motions for the occluded motion frames can be infilled with different time lengths (e.g., different number of frames and different values of t spanning the infilled interval), and physics plausibility of the captured motion on the reconstructed terrain can be provided.

For an occluded frame, the high-level controller 122 samples specific latent code $z_{t+1}$ for $\pi_M$. In other words, to ensure reaching the same position of $\tilde{Q}_{t_2}$ at $t_2$ from $\tilde{Q}_{t_1}$, a trajectory following task is formulated. The trajectory $x_t$ guides the dynamic character to reach $\tilde{Q}_{t_2}$ from $\tilde{Q}_{t_1}$ step-by-step (e.g., a various values of t), and drive the dynamic character to have a pose similar to or the same as that at $\tilde{Q}_{t_2}$. For example, the root translation of $(\tilde{\tau}_{t_1}, \tilde{\tau}_{t_2})$ is interpolated as a trajectory $x_t$, e.g., $x_{t_1}$, $x_{t_2}$ for the missing or occluded frames. For each time step $t \in (t_1, t_2)$ (e.g., each value oft), the input 410 of the high-level controller 122 includes the generated motion state $$\hat{S}_t^g$$

(corresponding to the generated motion $$\left(\text{corresponding to the generated motion } \hat{Q}_t^g\right),$$

), the simulated motion state $\hat{S}_t$ (corresponding to the simulated motion $\hat{Q}_t$), the future trajectory $x_t$, the mesh of the constructed terrain G, the target motion $\tilde{Q}_{t_2}$ (e.g., $\tilde{Q}_{t+1}$), and so on. The high-level controller 122 provides the specific latent code $$z_{t+1}^g \text{ (e.g., } z_{t+1})$$

to the motion model 126 for kinematics policy $\pi_M$ to assure that the generated motion is walking to the visible motion $\tilde{Q}_{t_2}$ step by step.

To adapt the kinematics policy $\pi_M$ to the real world, the high-level controller 122 can predict or otherwise determine the residuals $$z_{t+1}^r$$

to the root translation, root orientation, and body pose of the generated motion at time step t+1, in the examples in which the motion model 126 is trained using only video sequences capturing indoor motion and/or on flat terrain. That is, the residuals $$z_{t+1}^r$$

can be determined and supplied to the motion model 126 when there is a domain gap, where the domain gap would otherwise cause the motion model 126 to have issues with producing motions on even terrains for AI scenarios. In some examples, the residuals $$z_{t+1}^r$$

may have components such as root translation, root orientation, and character body pose. Different from motion generation on flat ground, the terrain height is introduced as the observation to $\pi_C$. Thus, the motion for missing or occluded frames at t+1 can be generated as following:

$$z_{t+1}^g, z_{t+1}^r = \pi_C\left(\hat{S}_t^g, \hat{S}_t, x, G, \tilde{Q}_{t_2}\right); \tag{5}$$

$$\hat{S}_{t+1}^g = \pi_M\left(\hat{S}_t^g, z_{t+1}^g\right) + z_{t+1}^r; \tag{6}$$

$$\hat{a}_{t+1} = \pi_D\left(\hat{S}_t, \hat{S}_{t+1}^g\right); \text{ and} \tag{7}$$

$$\hat{S}_{t+1} = Sim\left(\hat{S}_t, \hat{\mathcal{T}}_{t+1}\right) = Sim\left(\hat{S}_t, PD\left(\hat{a}_{t+1}\right)\right). \tag{8}$$

Accordingly, the high-level controller 122 corresponds the local motion to an interpolated trajectory and motion-matches the local motion to at least one visible pose.

The physics-based motion imitator 130 can employ dynamics policy $\pi_D$ to adapt the generated motion $$\left(\text{e.g., } \hat{Q}_{t+1}^g\right)$$

to the reconstructed terrains G, which may be uneven. The dynamics policy $\pi_D$ can imitate the target pose using a pre-trained model or policy network. After generating the motion at time step t+1, the height of the translation $$\tau_t^g$$

can be adapted by the height of reconstructed terrain G to correctly contact the generated motion to the ground (e.g., removing floating and penetration to the reconstructed terrain G by the dynamic characters), as the target motion. Then, the physics-based motion imitator 130 can use the dynamics policy $\pi_D$ to predict the target joint angle as $\alpha_{t+1}$ for the physics simulator, based on this adapted motion $$\tau_t^g,$$

as well as the state of physics simulator at previous time step t. The proportional-derivative (PD) controllers at each non-root joint can be used to produce joint torques $\hat{T}_{t+1}$ and resulting in the physics-plausible motion state $\hat{S}_{t+1}$ (corresponding to the infilled dynamic character motion $\hat{Q}_{t+1}$) for t+1 defined as:

$$\hat{S}_{t+1} = \left(\hat{\tau}_{t+1}, \hat{r}_{t+1}, \hat{\theta}_{t+1}, \hat{J}_{t+1}, \hat{\dot{\tau}}_{t+1}, \hat{\dot{r}}_{t+1}, \hat{\dot{J}}_{t+1}\right). \tag{9}$$

which correspond to the root translation, root orientation, body pose, joint position, the velocity of translation, velocity of rotation, and the velocity of joints, respectively. That is, the physics-based motion imitator 130 contacts the local motion to the terrain by imitating a target pose using a dynamics policy. Penetration free contact of the one or more dynamic characters can be determined with the terrain.

At B206, the physics-based motion imitator 140 can determine physics-plausible whole body motion $\overline{Q}$ of the at least one dynamic character by applying physics-based imitation upon the occlusion-free motion. For example, a physics-based optimization method is deployed on the generated motion $\hat{Q}$ to ensure consistency between the generated motions $\hat{Q}$ and observations $\tilde{Q}$. The generated motion $\hat{Q}$ may not align with the image evidence (e.g., video sequence).

Accordingly, the physics-plausible whole body motions $\tilde{Q}$ can be captured. The entire body of the dynamic character is filtered for some occluded motions, even in view of several high confidence estimation on partial body and keypoints. Output motions $\hat{Q}$ for high confidence parts are obtained by the generation model (e.g., the machine learning model 420), thus causing the inconsistency to the observation.

To close these gaps, a physics-based motion optimization method can adjust the motion $\hat{Q}$ to output the physics-plausible whole body motions $\overline{Q}$. This dynamic policy includes the physics-based motion imitator 140 (e.g., a second physics-based motion imitator) implementing the policy $\pi_K$ (similar to $\pi_D$) to maintain the physics plausibility during matching 2D kinematics results. Accordingly, the structure of the second physics-based motion imitator 140 can be the same or similar to the first physics-based motion imitator 130. This dynamic policy also includes residuals $$\{\delta R_i\}_{i=1}^{T}$$

for the target motion $\hat{Q}$ of the imitator for each time step of the T length motion sequence $$\{Q_i\}_{i=1}^{T}.$$

The final output of this step is captured motion $$\{\overline{Q}_i\}_{i=1}^{T}$$

for the input video sequence. For example, during optimization in B206, the imitation target motion $\hat{Q}_{t+1}$ is adjusted by $\delta R_{t+1}$, encouraging the physics-aware imitator to predict consistent motion $\hat{\alpha}_{t+1}$ with video observation. The residual parameters are added to the root orientation and body pose of characters in the simulator.

In some embodiments, the beginning motion $\overline{Q}_1$ of dynamic policy $\pi_K$ is the same as the motion $\hat{Q}_1$. For each time step t, motion $\overline{Q}_{t+1}$ can be obtained by imitating the motion $\hat{Q}_{t+1}$ through the policy $\pi_K$. For the consistency between $\overline{Q}_{t+1}$ and the observation, the additional parameters can be introduced to adjust the imitation target $\hat{Q}_{t+1}$. The residuals can be added to the root orientation and body pose of Q. After training, the updating of each component can be as follows:

$$\hat{r}^{u}_{t+1} = \hat{r}_{t+1} + \delta\hat{R}_{t+1},\ \hat{\theta}^{u}_{t+1} = \hat{\theta}_{t+1} + \delta\hat{R}^{\theta}_{t+1}; \tag{10}$$

$$\hat{S}^{u}_{t_1+1} = \hat{\tau}_{t+1},\ \hat{r}^{u}_{t+1},\ \hat{\theta}^{u}_{t+1},\ \hat{J}_{t+1},\ \hat{\dot{\tau}}_{t+1},\ \hat{\dot{r}}_{t+1},\ \hat{\dot{J}}_{t+1}. \tag{11}$$

Elements of $$\hat{S}^{u}_{t_1+1}$$

correspond to the root translation, root orientation, body pose, joint position, the velocity of translation, velocity of rotation, and the velocity of joints, respectively at t+1.

Based on this adapted target motion, the policy $\pi_K$ can be used to predict the target joint angle as $\overline{\alpha}_{t+1}$ for the physics-aware simulator, and to produce joint torques $\overline{T}_{t+1}$ to obtain the final result $\overline{Q}_{t+1}$ by the physics simulator as following, for example:

$$\overline{a}_{t+1} = \pi_K\left(\overline{S}_t,\ \hat{S}^{u}_{t_1+1}\right);\text{ and} \tag{12}$$

$$\overline{S}_t = Sim\left(\overline{S}_t,\ \overline{T}_{t+1}\right) = Sim\left(\overline{S}_t,\ PD\left(\overline{S}_t,\ \overline{a}_{t+1}\right)\right). \tag{13}$$

In some examples, the training system 100 can train the generative model to develop a kinematics policy $\pi_M$ and dynamics policy $\pi_D$ respectively. For example, a CVAE can be trained as the motion model 126.

FIG. 5 is a flow diagram showing a method 500 for training a machine learning model for generating physics-plausible whole body motions, in accordance with some embodiments of the present disclosure. Each block of method 500, described herein, includes a computing process that may be performed using any combination of hardware, firmware, and/or software. For instance, various functions may be carried out by a processor executing instructions stored in memory. The method 500 may also be embodied as computer-usable instructions stored on computer storage media. The method 500 may be provided by a standalone application, a service or hosted service (standalone or in combination with another hosted service), or a plug-in to another product, to name a few. In addition, method 500 is described, by way of example, with respect to the systems of FIG. 1. However, this method 500 may additionally or alternatively be executed by any one system, or any combination of systems, including, but not limited to, those described herein.

At B502, the training system 100 updates an generative model (e.g., the model 180, the machine learning model 420, and so on) to generate, using as inputs a mesh sequence of motion of or more dynamic characters and a mesh of a terrain of a video sequence, an occlusion-free motion (e.g., the physics-plausible whole body motion $\overline{Q}$) of each of the one or more dynamic characters by infilling physics-plausible dynamic character motions (e.g., the infilled dynamic character motion $\hat{Q}$) in the mesh sequence for one or more occluded frames of the video sequence.

In some embodiments, B502 includes B504. At B504, the high-level controller 122 is updated by the training system 100. The generative model includes the high-level controller 122, which correspond a local motion to an interpolated trajectory and to motion-match the local motion to at least one visible pose, as described. The high-level controller 122 is updated using a PPO algorithm. The high-level controller 122 is updated according to at least one of a trajectory reward, an infill reward, or a smoothness reward.

For example, the high-level controller 122 can be updated (e.g., trained) for sampling specific latent codes for the CVAE model (e.g., the motion model 126) to finish these proposed tasks. The high-level controller 122 can implement a trajectory that traverses even uneven terrains, and motion matching for the last frame to ensure that the generated motion $\hat{Q}$ can reach the visible pose at $t_2$ from $t_1$. In some embodiments, the training system 100 can update the high-level controller 112 using a PPO algorithm. In training the high-level controller 112, the motion model 126, which is pretrained, is frozen. The reward r for training the high-level controller can be defined as:

$$r = w_p \cdot r_p + w_i \cdot r_i. \quad (14)$$

The reward for trajectory $r_p$ can be defined as:

$$r_p \exp\left(-\alpha_p\left(\left\|\hat{r}_p^{xy} - x_p^{xy}\right\|\right)\right), \quad (15)$$

where $$\hat{r}_p^{xy}$$

is the xy coordinates of the translation of physics state $\hat{S}_t$ and $$x_p^{xy}$$

is the interpolated trajectory at time step t. The infilling reward encourages the motion model 126 to generate similar motion as $\tilde{S}_{t_2}$, and between the physics state $\hat{S}_t$ and the infilling target $\tilde{S}_{t_2}$ can include:

$$r_i = \gamma_i \cdot \exp\left(-\alpha_i\left(\left\|\hat{S}_t - \tilde{S}_{t_2}\right\|\right)\right). \quad (16)$$

The weights $(w_p, w_i)$ and $(\alpha_t, \alpha_i)$ can be suitably adjusted and updated to fit different scenarios, test results, experiment parameters, and so on. $\gamma_i$ in some embodiments equals to 1 in the examples in which $t \in (t_2-15, t_2)$, otherwise, $\gamma_i$ is set as 0 (the task is only trajectory following).

Figure 6:
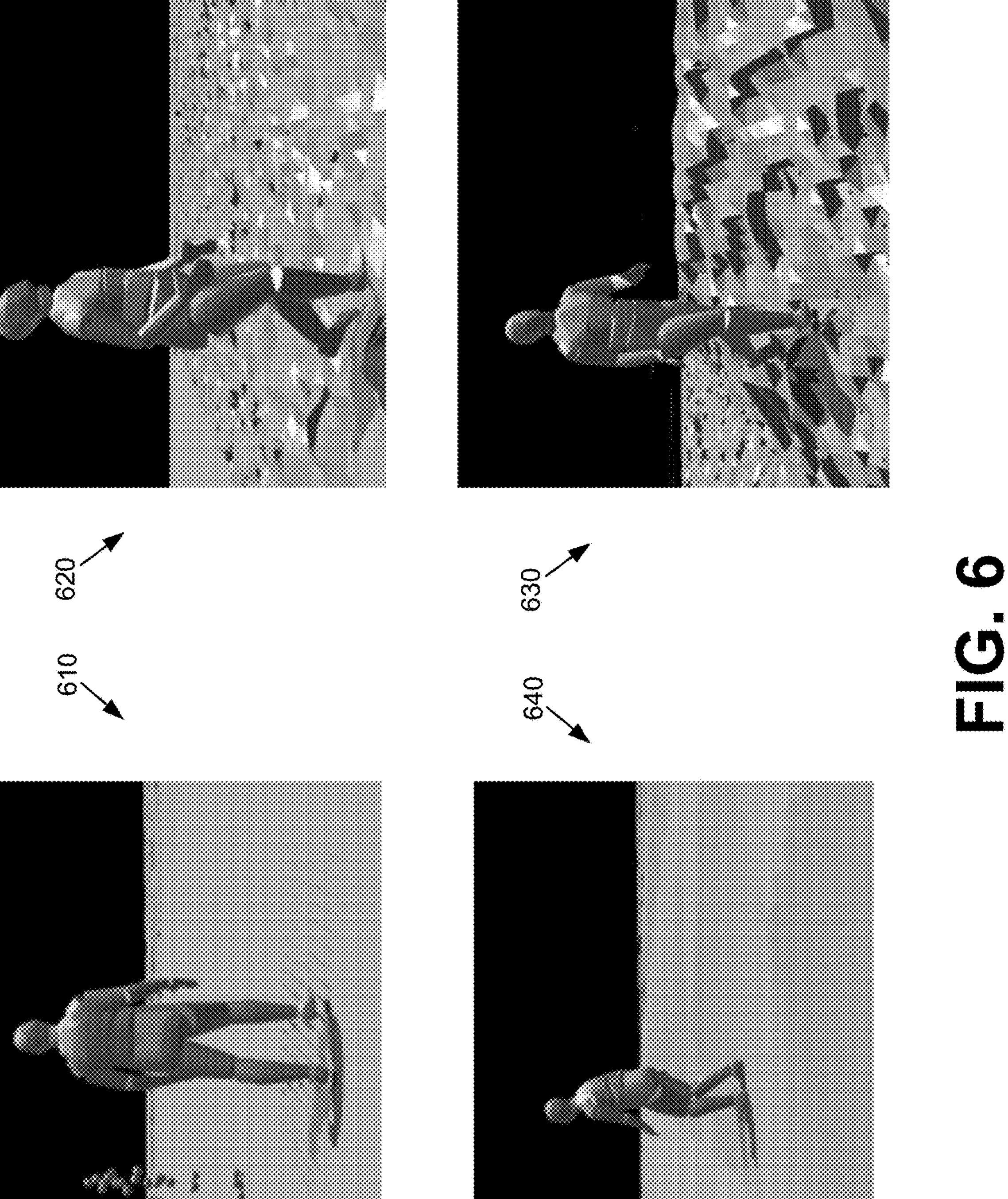
FIG. 6 illustrates example synthetic terrains, according to various embodiments of the present disclosure.

To reduce this time cost and obtain stable control for different environments (trajectories and terrains) in training the high-level controller 122, a pre-training and fine-tuning schedule can be implemented for training the high-level controller 122. Before the fine-tuning on different driving scenarios, and uneven terrains, different trajectories are first generated in a simulation engine. The high-level controller 122 can be trained on synthetic environments including the synthetic terrains and trajectories for the trajectory following task. To infill the ending motion, different motions in the AMASS dataset can be sampled for the motion matching task. FIG. 6 illustrates example synthetic terrains 610, 620, 630, and 640, according to various arrangements. Each of the synthetic terrains 610, 620, 630, and 640 can be generated in a simulation engine. For example, each of the synthetic terrains 610, 620, 630, and 640 can be defined using a height map. The varying distribution of height on the synthetic terrains 610, 620, 630, and 640 correspond to different types of synthetic terrains. The synthetic terrain 610 is a flat ground. The synthetic terrain 620 is a rough ground. The synthetic terrain 630 is a rough slope. The synthetic terrain 640 is a smooth slope. The synthetic terrains 610, 620, 630, and 640 can be used to pertain the high-level controller 122. The motion model 126 can be trained to allow dynamic characters to walk on various types of terrains, although the motion model 126 and the physics-based motion imitator 130 are trained on motions on flat ground.

Based on the pre-trained high-level controller 112, the time costing to fine-tune the high-level controller upon different scenarios can reduced, and convergence of fine-tuning on real data (e.g., the video sequence) can be improved. Accordingly, in some examples, the high-level controller 122 is pre-trained (e.g., updated) using synthesized terrains and synthesized trajectories for corresponding the local motion to the interpolated trajectory. In some examples, the high-level controller 122 is pre-trained (e.g., updated) using a dataset of motion capture (e.g., an AMASS dataset) to motion-match the local motion to the at least one visible pose.

In some embodiments, B502 includes B506. At B506, the motion model 126 is updated by the training system 100 to implement the kinematics policy $\pi_M$. The generative model includes the motion model 126 (e.g., a local motion generator) to generate a local motion (e.g., infilled dynamic character motion $\hat{Q}$) from a current frame to a next frame using a kinematics policy $\pi_M$ according to at least one of a root translation, a root orientation, a body pose, a joint position, a velocity of translation, a velocity of rotation, or a velocity of joints of each of the one or more dynamic characters.

In some embodiments, B502 includes B508. At B508, the physics-based motion imitator 130 is updated by the training system 100 to implement the policy $\pi_D$. The generative model includes the physics-based motion imitator 130 to contact a local motion to a terrain by imitating a target pose using a dynamics policy.

In some embodiments, B502 includes B510. At B510, the physics-based motion imitator 140 is updated by the training system 100 to implement the dynamic policy $\pi_K$. The generative model includes the physics-based motion imitator 140. In some embodiments, before training on the sequences in AV scenarios, the dynamic policy $\pi_K$ can be pre-trained on large scale motion sequences in the simulation engine. After, dynamic policy $\pi_K$ can be fine-tuned, and the residual parameters can be trained for each motion sequence. To encourage the consistency between the observation and the output motion, one or more embodiments can use the following reward function:

$$r_{proj} = \exp\left(-\alpha_p \sum\left(\left\|\prod(\bar{\mathcal{J}}_t) - \tilde{\mathcal{J}}_t^{2D}\right\| \times \tilde{c}_t\right)\right), \quad (17)$$

where $\Pi$ is the projection function from world to image space, $$\tilde{\mathcal{J}}_t^{2D}$$

is the estimated 2D pose at time step t, $\tilde{c}_t$ is the corresponding confidence score. In addition, reward function $r_{im}$ can be used for the physics-based motion imitator 140 to improve/enhance physics attributes for the motions with residuals. The final reward is represented for instance as:

$$r = r_{proj} \cdot w_p + r_{im} \cdot w_{im}. \quad (18)$$

The weights $(w_p, w_{im})$ and $(\alpha_p, \alpha_{im})$ can be suitably adjusted and updated to fit different scenarios, test results, experiment parameters, and so on.

Accordingly, given the reconstructed terrain G, captured motion $\{\tilde{Q}\}$ and the interpolated trajectory $\{x_t\}$, states of the motion model 126 and physics-based motion imitator 130 are initialized by $\tilde{Q}_1$. For each time t, if the motion is missing at t+1, the high-level controller 122 samples specific latent code $$z^g_{t+1}$$

and residuals $$z^r_{t+1}$$

to assure that the generated motion $$\hat{Q}^g_{t+1}$$

can walk on the real-world terrain under the guidance of trajectory. Otherwise, the captured motion $\{\tilde{Q}\}$ is directly used as the imitation target for $\pi_D$, which predicts the target joint angle of the target for the simulator. PD controllers are used on each non-root joint to produce joint torques and obtain the physics-plausible motions by the physics-based motion imitator 130. In some embodiments, residual force control (RFC) is used to improve the motion stability and apply a learned stabilizing force on the humanoid's root for better imitation results.

FIG. 8 is a flow diagram illustrating an example method 800 for generating a mesh of the terrain, according to various arrangements. The inputs to the method 800 includes the mesh of the processed terrain G, the trajectory $$\{x_t\}_{t=1}^M,$$

and the captured motion $$\{\tilde{Q}_t\}_{t=1}^M,$$

as well as the pre-trained policies $\pi_C$, $\pi_M$, and $\pi_D$. For $$t = 1, \hat{S}^g_1$$

and $\tilde{S}_1$ corresponds to $\tilde{Q}_1$. For each time step t, if the motion for the frame t+1 is missing, then expression (5) and expression (6) are calculated. On the other hand, if the motion for frame t+1 is captured and not missing, then physics state $$\hat{S}^g_{t+1}$$

is the same as the captured motion $\tilde{Q}_{t+1}$. The method 800 ends in response to detecting that expressions (7) and/or expression (8) are satisfied.

Example Content Streaming System

Now referring to FIG. 9, FIG. 9 is an example system diagram for a content streaming system 900, in accordance with some embodiments of the present disclosure. FIG. 9 includes application server(s) 902 (which may include similar components, features, and/or functionality to the example computing device 1000 of FIG. 10), client device(s) 904 (which may include similar components, features, and/or functionality to the example computing device 1000 of FIG. 10), and network(s) 906 (which may be similar to the network(s) described herein). In some embodiments of the present disclosure, the system 900 may be implemented to perform training of the machine learning model and runtime operations during employment. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 900 can be implemented to receive input indicating one or more features of output to be generated using a neural network model, provide the input to the model to cause the model to generate the output, and use the output for various operations including display or simulation operations.

In the system 900, for an application session, the client device(s) 904 may only receive input data in response to inputs to the input device(s), transmit the input data to the application server(s) 902, receive encoded display data from the application server(s) 902, and display the display data on the display 924. As such, the more computationally intense computing and processing is offloaded to the application server(s) 902 (e.g., rendering—in particular ray or path tracing—for graphical output of the application session is executed by the GPU(s) of the game server(s) 902). In other words, the application session is streamed to the client device(s) 904 from the application server(s) 902, thereby reducing the requirements of the client device(s) 904 for graphics processing and rendering.

For example, with respect to an instantiation of an application session, a client device 904 may be displaying a frame of the application session on the display 1024 based on receiving the display data from the application server(s) 902. The client device 904 may receive an input to one of the input device(s) and generate input data in response. The client device 904 may transmit the input data to the application server(s) 902 via the communication interface 920 and over the network(s) 906 (e.g., the Internet), and the application server(s) 902 may receive the input data via the communication interface 918. The CPU(s) 908 may receive the input data, process the input data, and transmit data to the GPU(s) 910 that causes the GPU(s) 910 to generate a rendering of the application session. For example, the input data may be representative of a movement of a character of the user in a game session of a game application, firing a weapon, reloading, passing a ball, turning a vehicle, etc. The rendering component 912 may render the application session (e.g., representative of the result of the input data) and the render capture component 914 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 902. In some embodiments, one or more virtual machines (VMs)—e.g., including one or more virtual components, such as vGPUs, vCPUs, etc.—may be used by the application server(s) 902 to support the application sessions. The encoder 916 may then encode the display data to generate encoded display data and the encoded display data may be transmitted to the client device 904 over the network(s) 906 via the communication interface 918. The client device 904 may receive the encoded display data via the communication interface 920 and the decoder 922 may decode the encoded display data to generate the display data. The client device 904 may then display the display data via the display 1024.

Example Computing Device

Figure 10:
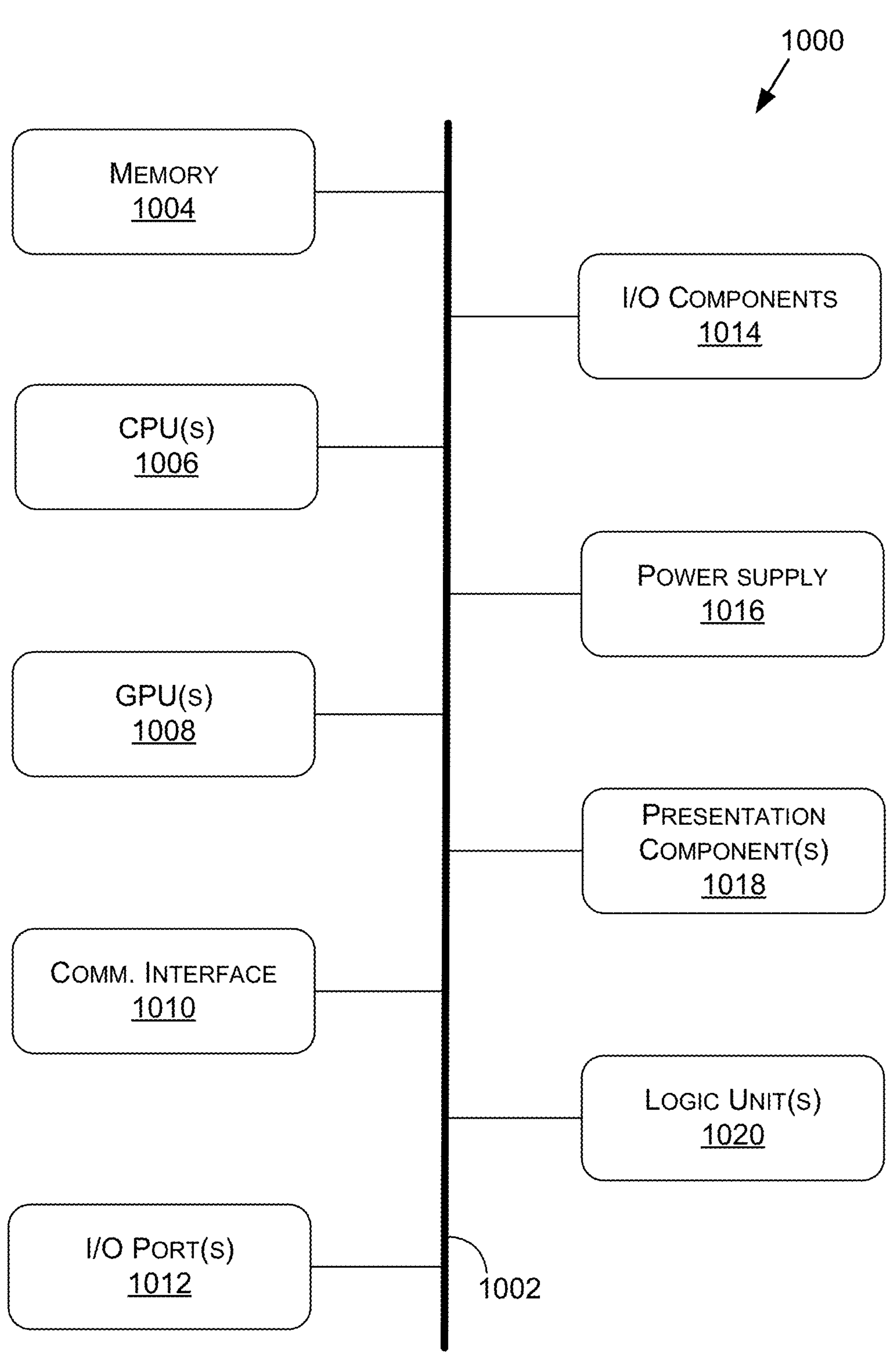
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may be arranged in various topologies, including but not limited to bus, star, ring, mesh, tree, or hybrid topologies. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that allow the computing device 1000 to communicate with other computing devices via an electronic communication network, included wired and/or wireless communications. The communication interface 1010 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008. In some embodiments, a plurality of computing devices 1000 or components thereof, which may be similar or different to one another in various respects, can be communicatively coupled to transmit and receive data for performing various operations described herein, such as to facilitate latency reduction.

The I/O ports 1012 may allow the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user, such as to generate a driving signal for use by modifier 112, or a reference image (e.g., images 104). In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that allow detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to allow the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
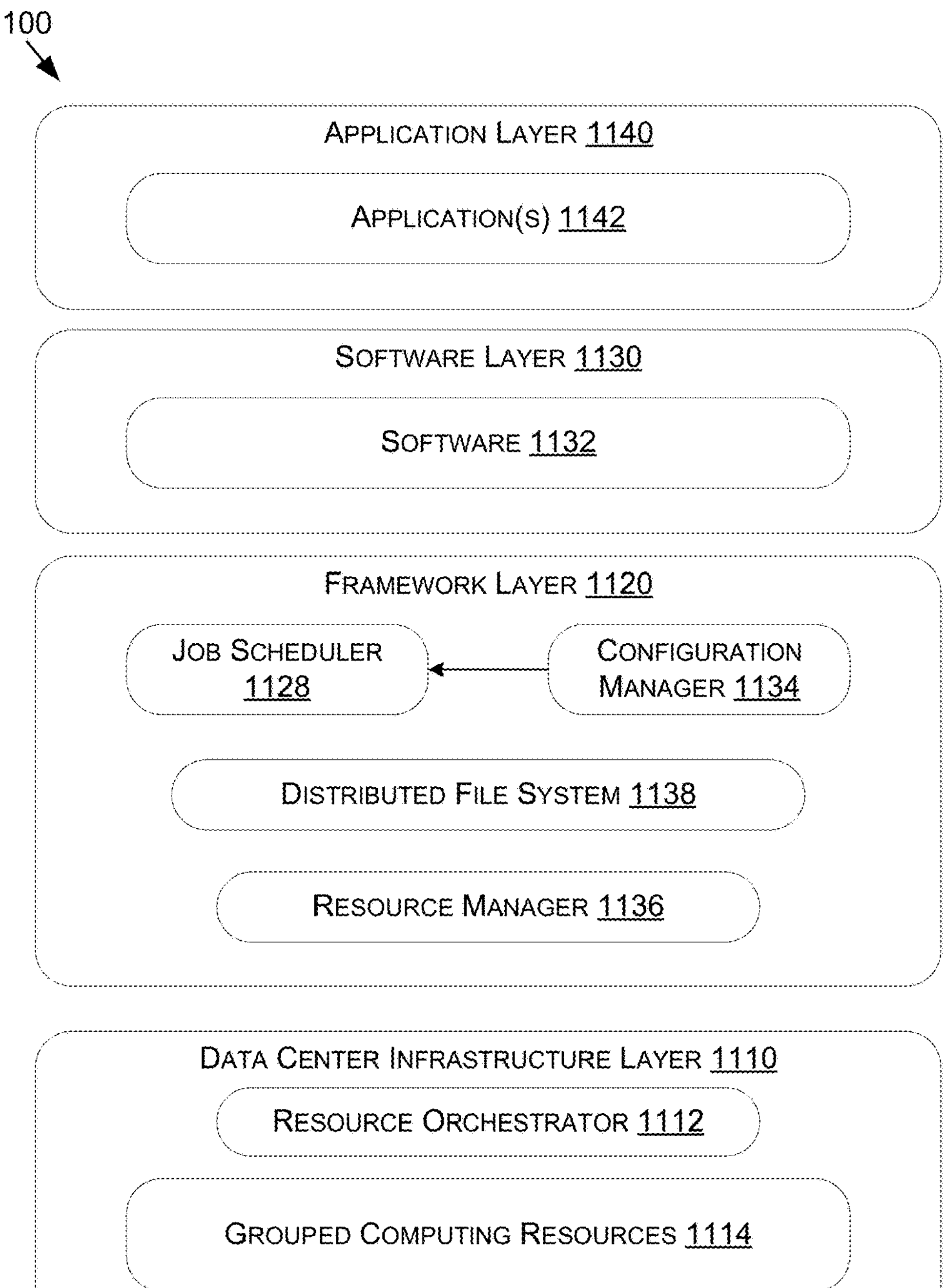
FIG. 11 is a block diagram of an example data center suitable for use in implementing some embodiments of the present disclosure.

FIG. 11 illustrates an example data center 1100 that may be used in at least one embodiments of the present disclosure, such as to implement the system 100 in one or more examples of the data center 1100. The data center 1100 may include a data center infrastructure layer 1110, a framework layer 1110, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-1116(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1110 may include a job scheduler 1118, a configuration manager 1134, a resource manager 1136, and/or a distributed file system 1138. The framework layer 1110 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1110 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1118 may include a Spark driver to facilitate scheduling of workloads supported by various layers of data center 1100. The configuration manager 1134 may be capable of configuring different layers such as software layer 1130 and framework layer 1110 including Spark and distributed file system 1138 for supporting large-scale data processing. The resource manager 1136 may be capable of managing clustered or grouped computing resources mapped to or allocated for support of distributed file system 1138 and job scheduler 1118. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1110. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1110. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to train, configure, update, and/or execute machine learning models 104, 204.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models (e.g., to implement the learning system 116, to train or update the policy network 124 and the discriminator 114, etc.) or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor, comprising:

one or more circuits to:

determine, using a same video sequence:

a mesh sequence corresponding to a motion of at least one dynamic human character of one or more dynamic human characters; and a mesh of a terrain;

determine, using a generative model and based at least on the mesh sequence and the mesh of the terrain, an occlusion-free motion of the at least one dynamic human character by infilling physics-plausible human character motions in the mesh sequence for at least one frame of the video sequence that includes an occlusion of at least a portion of the at least one dynamic human character; and determine physics-plausible whole body motion of the at least one dynamic human character by applying physics-based imitation upon the occlusion-free motion.

2. The processor of claim 1, wherein the motion is defined by one or more of a root translation, a root rotation, a body motion, or a body shape.

3. The processor of claim 1, wherein the motion is defined by a global orientation for one of:

an occluded frame;

a beginning frame; or an ending frame.

4. The processor of claim 1, wherein the one or more circuits are to determine the mesh of the terrain by reconstructing the terrain using light detection and ranging (LiDAR) point clouds.

5. The processor of claim 1, wherein the one or more circuits are to infill the physics-plausible human character motions in the mesh sequence for the one or more frames of the video sequence that includes an occlusion of at least a portion of the at least one dynamic human character by infilling the physics-plausible human character motions between at least two frames of the video sequence that does not include an occlusion of at least a portion of the at least one dynamic human character.

6. The processor of claim 5, wherein the one or more circuits are to implement a local motion generator to generate a local motion from a current frame to a next frame using a kinematics policy according to at least one of a root translation, a root orientation, a body pose, a joint position, a velocity of translation, a velocity of rotation, or a velocity of joints of each of the one or more dynamic human characters.

7. The processor of claim 6, wherein the one or more circuits are to implement a high-level controller to associate the local motion with an interpolated trajectory and to motion-match the local motion to at least one visible pose, wherein the high-level controller provides latent code for the kinematics policy.

8. The processor of claim 6, wherein the one or more circuits are to implement a physics-based motion imitator to simulate the local motion with a physics-plausible level of contact with the mesh of the terrain by imitating a target pose using a dynamics policy.

9. The processor of claim 1, wherein the one or more circuits are to determine penetration free contact of the one or more dynamic human characters with the mesh of the terrain.

10. The processor of claim 1, wherein the one or more circuits are to:

determine the physics-plausible human character motions by applying at least one a policy upon the occlusion-free motion; and adjust the physics-plausible human character motions using a residual parameter.

11. A processor, comprising:

one or more circuits to:

update a generative model to generate, using as inputs a mesh sequence of motion of one or more dynamic characters and a mesh of a terrain of a video sequence, an occlusion-free motion of each of the one or more dynamic characters by infilling physics-plausible character motions in the mesh sequence for one or more occluded frames of the video sequence, the generative model including a controller to associate a local motion with an interpolated trajectory, and to motion-match the local motion to at least one visible pose, the updating of the generative model including updating the controller at least by:

pre-training the controller using synthesized terrains and synthesized trajectories for corresponding the local motion to the interpolated trajectory; and pre-training the controller using a dataset of motion capture, to motion-match the local motion to the at least one visible pose.

12. The processor of claim 11, wherein the controller is updated using a proximal policy optimization (PPO) algorithm.

13. The processor of claim 11, wherein the controller is updated according to at least one of a trajectory reward, an infill reward, or a smoothness reward.

14. The processor of claim 11, wherein:

the generative model comprises a local motion generator to generate a local motion from a current frame to a next frame using a kinematics policy according to at least one of a root translation, a root orientation, a body pose, a joint position, a velocity of translation, a velocity of rotation, or a velocity of joints of each of the one or more dynamic characters; and the one or more circuits are to update the generative model by updating the local motion generator to implement the kinematics policy.

15. The processor of claim 11, wherein:

the generative model comprises a physics-based motion imitator to contact a local motion to the mesh of the terrain by imitating a target pose using a dynamics policy; and the one or more circuits are to update the generative model by updating the physics-based motion imitator to implement the dynamics policy.

16. A method, comprising:

determining, using a video sequence:

a mesh sequence of motion of one or more dynamic human characters; and a mesh of a terrain;

determining using a generative model, the mesh sequence and the mesh, an occlusion-free motion of the one or more dynamic human characters by infilling physics-plausible human character motions in the mesh sequence for occluded frames of the video sequence; and determining physics-plausible whole body motion of each of the one or more dynamic human characters by applying physics-based imitation upon the occlusion-free motion.

17. The method of claim 16, comprising infilling the physics-plausible human character motions in the mesh sequence for the occluded frames of the video sequence by infilling the physics-plausible human character motions between two occlusion-free frames of the video sequence.

18. The method of claim 16, comprising:

determining the physics-plausible whole body motion by applying at least one a policy upon the occlusion-free motion; and adjusting the physics-plausible whole body motion using a residual parameter.

* * * * *